(12) United States Patent
Jiao et al.

(10) Patent No.: US 7,164,430 B2
(45) Date of Patent: Jan. 16, 2007

(54) ANTI-ALIASING LINE PIXEL COVERAGE CALCULATION USING PROGRAMMABLE SHADER

(75) Inventors: Yang (Jeff) Jiao, San Jose, CA (US); Zhou (Mike) Hong, Cupertino, CA (US)

(73) Assignee: VIA Technologies, Inc., Taipei (TW)

( * ) Notice: Subject to any disclaimer, the term of this patent is extended or adjusted under 35 U.S.C. 154(b) by 238 days.

(21) Appl. No.: 10/671,849

(22) Filed: Sep. 25, 2003
(Under 37 CFR 1.47)

(65) Prior Publication Data
US 2005/0068321 A1   Mar. 31, 2005

(51) Int. Cl.
*G09G 5/00* (2006.01)

(52) U.S. Cl. .................. 345/611; 345/428; 345/581; 345/597; 345/606; 345/612; 345/614; 345/615; 345/617; 345/441; 345/443; 382/193; 382/194; 382/199; 382/202; 382/258; 382/264; 382/266; 382/269; 382/272

(58) Field of Classification Search ............... 345/506, 345/611, 597, 612, 614, 615, 617; 382/193
See application file for complete search history.

(56) References Cited

U.S. PATENT DOCUMENTS 5,872,902 A * 2/1999 Kuchkuda et al. .......... 345/615
6,329,977 B1 * 12/2001 McNamara et al. ........ 345/589
6,433,790 B1 * 8/2002 Taylor et al. ............... 345/611
6,847,375 B1 * 1/2005 Wada ......................... 345/589
6,954,211 B1 * 10/2005 Michail et al. ............. 345/581
2003/0210251 A1 * 11/2003 Brown ....................... 345/611

\* cited by examiner

*Primary Examiner*—Kee M. Tung
*Assistant Examiner*—Antonio Caschera
(74) *Attorney, Agent, or Firm*—Thomas, Kayden, Horstemeyer & Risley

(57) ABSTRACT

A system and method for rendering a non-zero thickness line on a pixel-limited output device such that aliasing of the line is reduced. The edges defining a line segment are expanded to insure that any pixel touched by the line segment has its center included in the bounds of the line segment. The area of any pixel partially or fully covered by the expanded line is determined. If one edge of the line traverses the pixel, the area is determined according to whether a triangular or triangular plus parallelogram area is covered. If more than one edge of the line segment traverses a pixel, the area covered is computed based on the single edge case. With the area covered by the line segment known, the color or shading of the pixel is determined by linear interpolation between the line and the background.

18 Claims, 15 Drawing Sheets

ANTI-ALIASING LINE PIXEL COVERAGE CALCULATION USING PROGRAMMABLE SHADER

FIELD OF THE INVENTION

The present invention relates generally to computer graphics and more particularly to the drawing of lines to minimize or reduce aliasing effects from a limited resolution output device.

DESCRIPTION OF THE RELATED ART

Drawing lines is a fundamental operation in computer graphics systems. Commonly, these computer graphics systems employ displays that have a certain limited number of picture elements (pixels) which determine the resolution of the display. The limited resolution of the display has an effect on the drawing of lines, however, because each pixel of the display is in effect a spatial sampling point for the line to be drawn. It is well-known that when there are too few sampling points for the spatial frequency inherent in an object being represented, including a line, then the limited resolution of the display may either poorly represent, misrepresent, or completely miss the object. This phenomenon is called aliasing and occurs not only for spatially sampled objects but also for temporally sampled events.

The result of aliasing when lines are drawn on a computer graphics display is that for some lines, usually lines at certain angles, rather than horizontal or vertical lines, the line appears ragged on its edges. This ragged appearance of the line is unpleasant to the user and makes it difficult to render clean looking drawings on the display or even a resolution limited printing device. Relatively thin lines make the lines look worse. One can increase the resolution of the graphics display or other output device in an effort to reduce this problem. However, the increased number of pixels requires a much greater amount of processing and much greater amount of memory for storing the pixels. Therefore, it has become desirable to seek means for reducing or eliminating the ragged appearance of the drawn lines by a variety of anti-aliasing techniques, among which are pre-filtering, supersampling and postfiltering.

Pre-filtering involves computing the fractional coverage of a pixel by a non-zero thickness line and using that fraction to decide what the pixel intensity should be. In order to determine the fractional coverage of a pixel, an algorithm used to draw the line must determine the pixels to be included in rendering the line on the display.

One way to determine whether a pixel should be included in the rendering of a line, is to consider a pixel as a unit-size rectangle having a center and determine whether or not that center is within the bounds of the line. FIG. 1 shows the pixels 12–54 involved in drawing a line segment 10 in accordance with this pixel-center rule. As is clearly observable, the pixels 12–54 included in the line segment 10 shown give the segment a somewhat jagged appearance. As mentioned above, it is desirable to improve on the appearance of such a line segment without increasing the number of pixels in the output device.

BRIEF SUMMARY OF THE INVENTION

The present invention is directed towards realizing the above-mentioned improvement. A method in accordance with the present invention includes a method in a computer graphics system for rendering on an output device, having a finite number of pixels, a non-zero thickness line segment with reduced aliasing. The method includes expanding an edge of the line segment touching but not covering a pixel center of the line segment to be rendered on the output device so that the expanded line segment covers the center of the pixel touched. Then, using the pixel centers, the pixels to be included in the expanded line segment are determined, where the line segment being distinguishable from a background over which said line segment is rendered by having a shade or color different from a shade or color of the background. For each pixel that is included in said non-zero thickness expanded line segment, the area of the pixel partially- or fully-covered by the line segment is determined and based on the area of the pixel covered, a shading or color value for the pixel is determined by interpolating between the shade of the line segment and the shade or color of the background.

One advantage of the present invention is that aliasing is of the line segment is reduced or minimized, thereby permitting more accurate and better appearing lines rendered on the output device.

Another advantage of the present invention is that the computational cost of performing the anti-aliasing of the present invention is reduced.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

In the discussion that follows, it is assumed that the equation of the line, ax+by+c=0, is known and that a coordinate system is imposed on the output device with the x-direction increasing to the right and the y-direction increasing downward. Also, for purposes of the present discussion, the line is assumed to be sloping upwards to the right, such that $a \geq b \geq 0$. It is also convenient to define certain parameters of the line. First, the slope m of the line is defined as $|a|/|b|$ and the slope-factor sf for the line is defined as $m/(m+1)$. Using the latter definition is helpful because as the slope ranges from 0 to $\infty$, the slope factor ranges from 0 to 1. The slope m of the line may be expressed as a function of the slope factor, $m=sf/(1-sf)$. Second, a parameter, $p=sf \cdot \Delta x$, which is the product of the slope factor sf of the edge equation of the line segment and an x-directed displacement, $\Delta x$, will prove useful.

In accordance with the present invention, the pixels to be included in the rendering of a non-zero thickness line must be determined. Given a pixel P with coordinates $(x_0, y_0)$ and one line edge relation $ax+by+c \geq 0$, to determine whether a pixel P is inside the edge, the line segment edge relation $ax+by+c \geq 0$ is evaluated at the pixel coordinate $(x_0, y_0)$. If the result is greater than or equal to zero, the pixel is inside the edge. If the pixel is inside all of the four edges of line segment then it is to be included in the rendering of the line.

Figure 1:
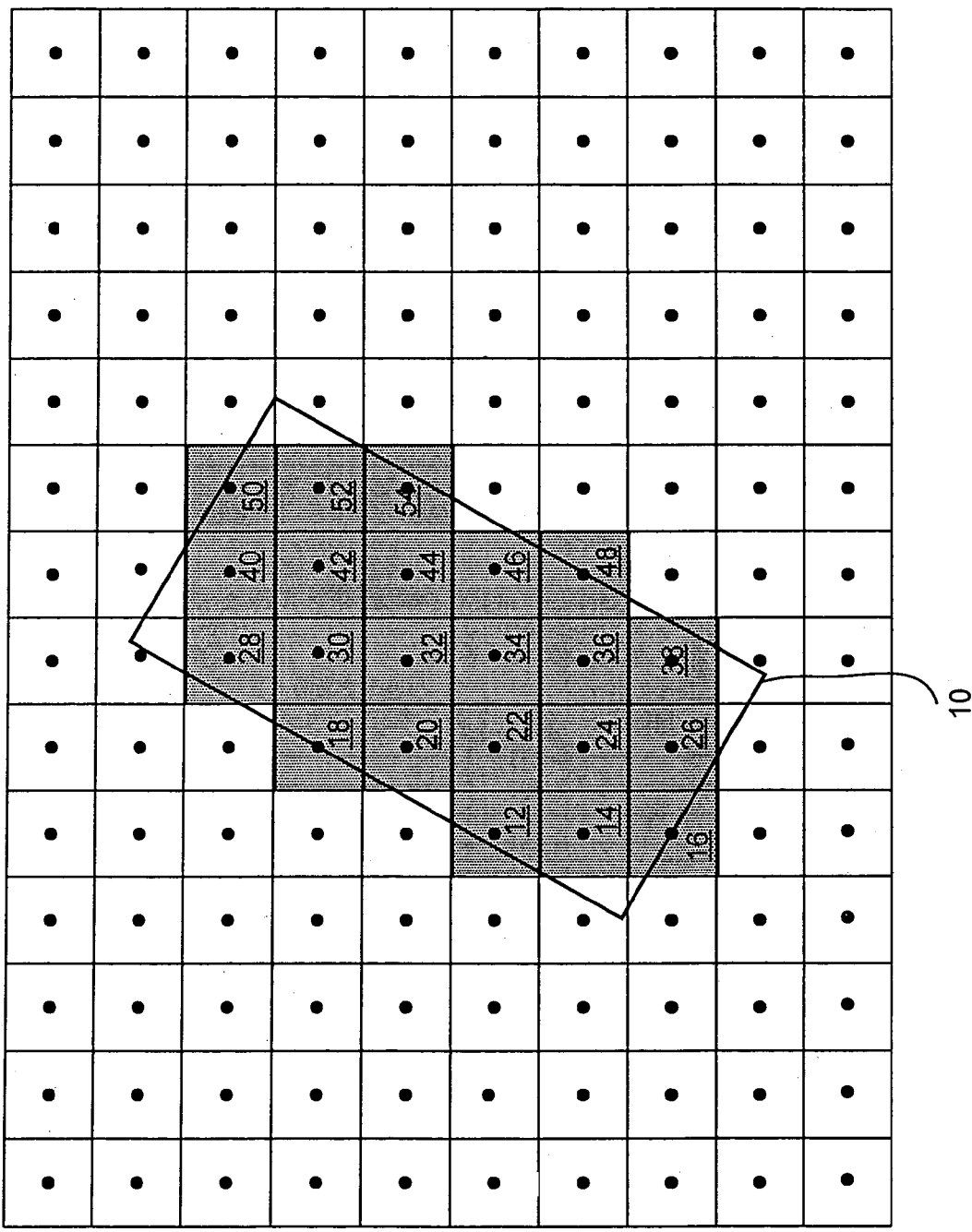
FIG. 1 shows the appearance of a line on a limited resolution output device when a non-zero thickness line is drawn in accordance with a conventional pixel-center rule.
Figure 2:
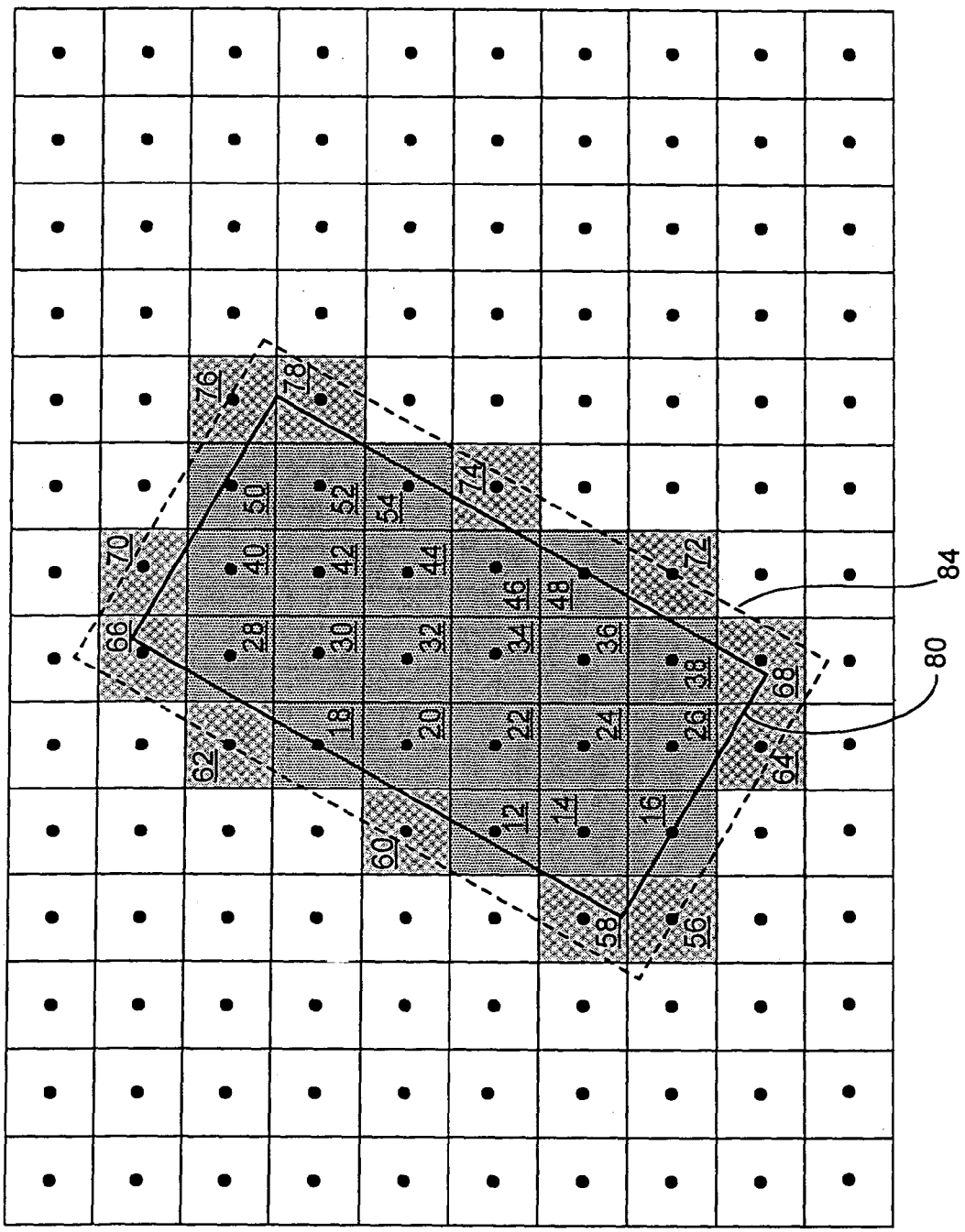
FIG. 2 shows the appearance of a line on a limited resolution output device when a non-zero thickness line is expanded to include pixels that are touched but whose centers are not within the borders of the original line.

FIG. 2 shows the appearance of a line segment 80 on a limited resolution output device when a non-zero thickness line is rendered using the centers of the pixels to decide whether the pixel is to be included. To improve the appearance of the line segment 80 shown in FIG. 1, it is desirable that those pixels 56–78 that are touched by the non-zero thickness line but whose centers are not included within the bounds of line segment be included. As described above, these pixels 56–78 are not included in a line drawing algorithm that bases the inclusion of the pixel on whether or not the pixel center is covered by the non-zero thickness line. To include these pixels in the rendering of the line segment, the boundaries of the line segment are expanded, in accordance with the present invention, to include the centers of pixels that are touched by the edge of the line segment. The expansion of the line segment's edge can be interpreted as a change $\Delta c$ in the c parameter in the equation of the line edge.

Figure 6:
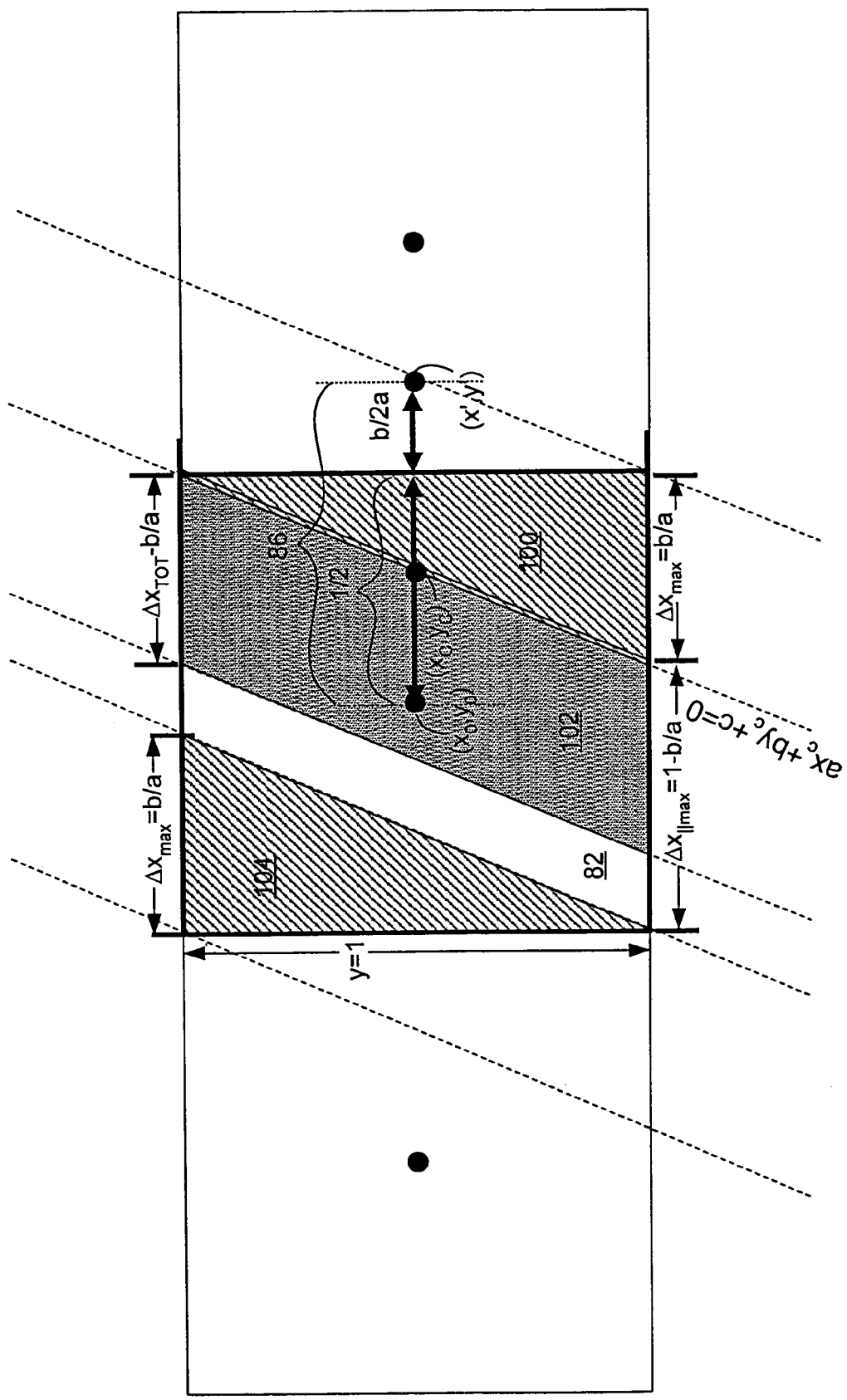
FIG. 6 shows an enlarged area of the output device depicting a set of pixels, the movement of the line boundary and the primitive triangles and parallelogram used to compute pixel coverage in accordance with the present invention.

Referring to FIG. 2 and FIG. 6, and taking one edge as example, suppose that the left edge of the original line 80 in FIG. 2 just touches the right bottom corner of the pixel 72, thereby partially covering the pixel. In accordance with the present invention, the edge of the line segment is expanded (shown as expanded line segment 84 in FIG. 2) to the left to include the center of the just barely touched pixel 72. In the x-direction, this expansion amounts to a displacement 86 in the x-coordinate of the line segment edge from X' to $x_0$ in FIG. 6. The displacement $$x' - x_0 = \Delta x = \frac{b}{2a} + \frac{1}{2} = \frac{a+b}{2a},$$

where the first term is the x-directed distance from x' to the pixel boundary and the second term is the x-directed distance from the pixel boundary to the pixel center $x_0$. This is the amount by which the c parameter must be adjusted to move the edge of the line over to include the center of a partially covered pixel. Note that the slope of the line is not being altered, only the y-intercept of the edge of the line. Because $$x' - x_0 = \frac{a+b}{2a},$$

the new line edge relation becomes $$ax_0 + by_0 + c + \frac{a+b}{2} \geq 0.$$

To determine whether a pixel is included in the rendering of the line now translates into evaluating the edge relation of the line $$ax + by + c + \frac{a+b}{2} \geq 0 \text{ at } (x_0, y_0).$$

Here it is assumed that $a \geq 0$, $b \geq 0$; for all other cases it is easy to prove that the same amount of adjustment $$\Delta c = \frac{|a| + |b|}{2}$$

applies to the other edges as well.

After the edges of the non-zero thickness line have been adjusted, it remains to compute the fractional area f of the included pixels covered by the line, assuming that the area of a pixel is unity. With the fractional area known, the shading or color of the pixel is then determined, in accordance with the invention, by linear interpolation between the shading or color $C_{LINE}$ of the line and the shading or color of the background $C_{BG}$, by $f*C_{LINE}+(1-f)*C_{BG}$.

Figure 3:
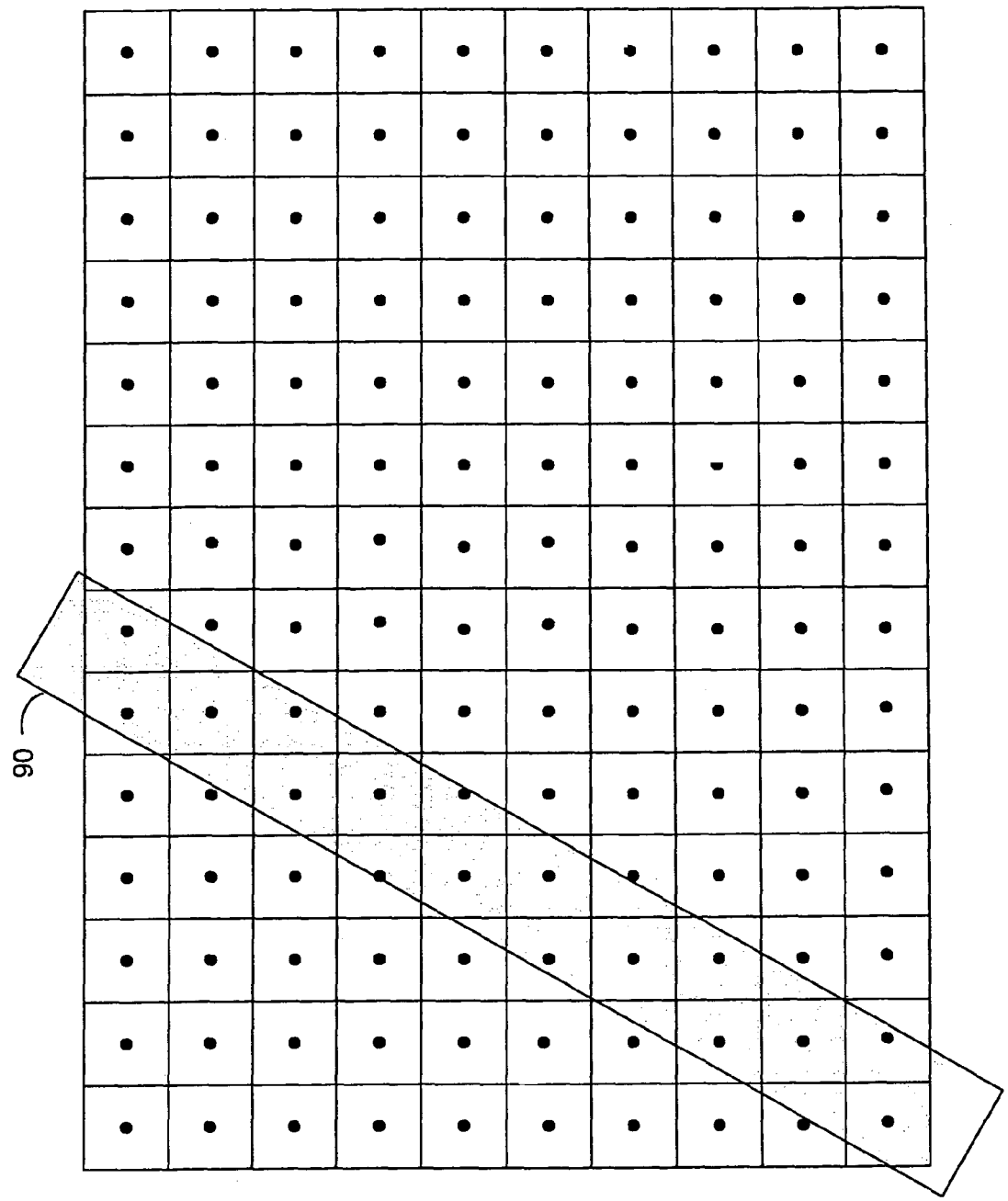
FIG. 3 shows a non-zero thickness line covering pixels in the output device such that only one edge of the line traverses any one pixel.
Figure 4A:
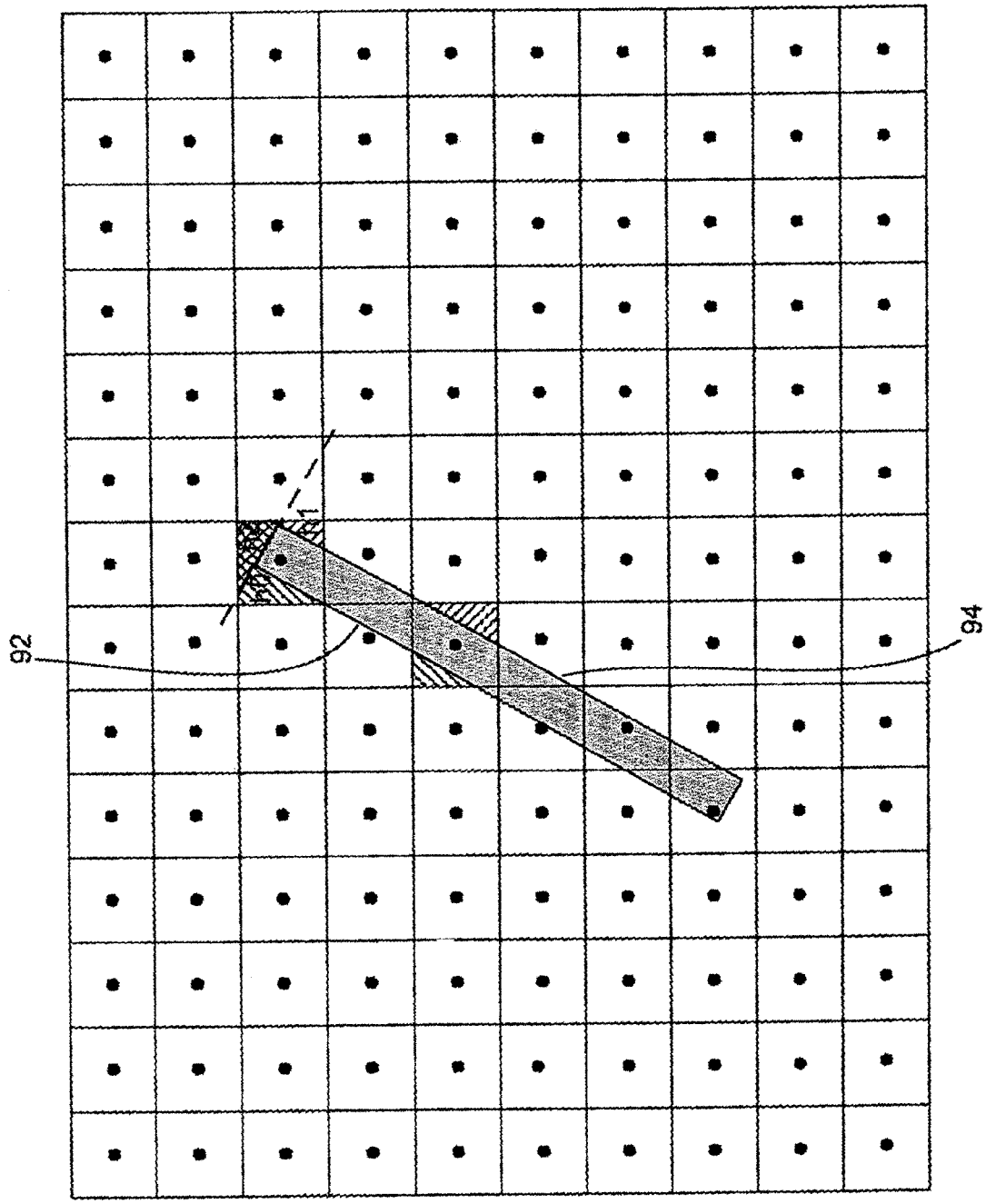
FIG. 4A. shows a non-zero thickness line covering pixels in the output device such that two or three edges of the line may traverse at least one of the pixels.
Figure 4B:
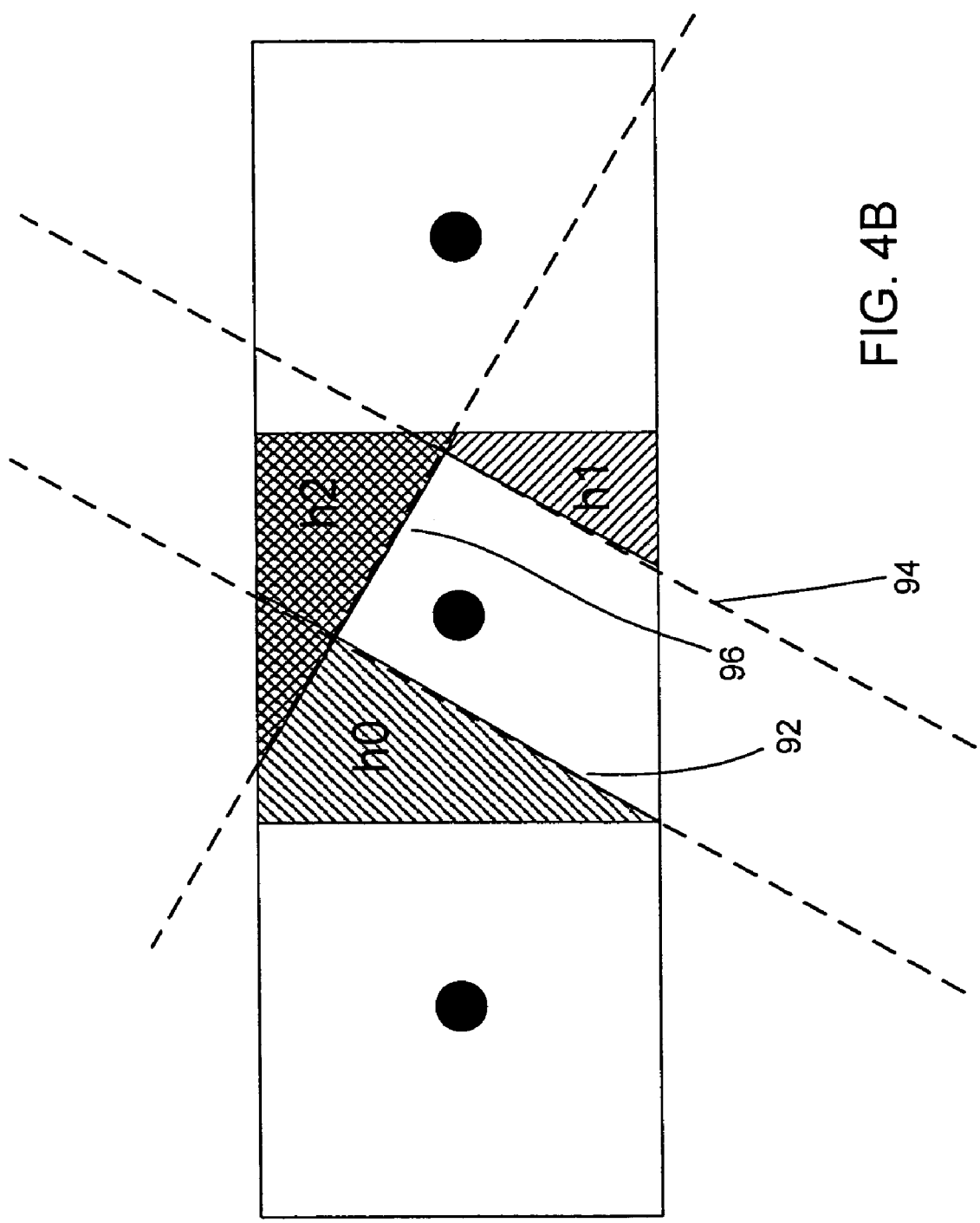
FIG. 4B shows an magnified version of the case where three edges traverse one of the pixels.
Figure 5:
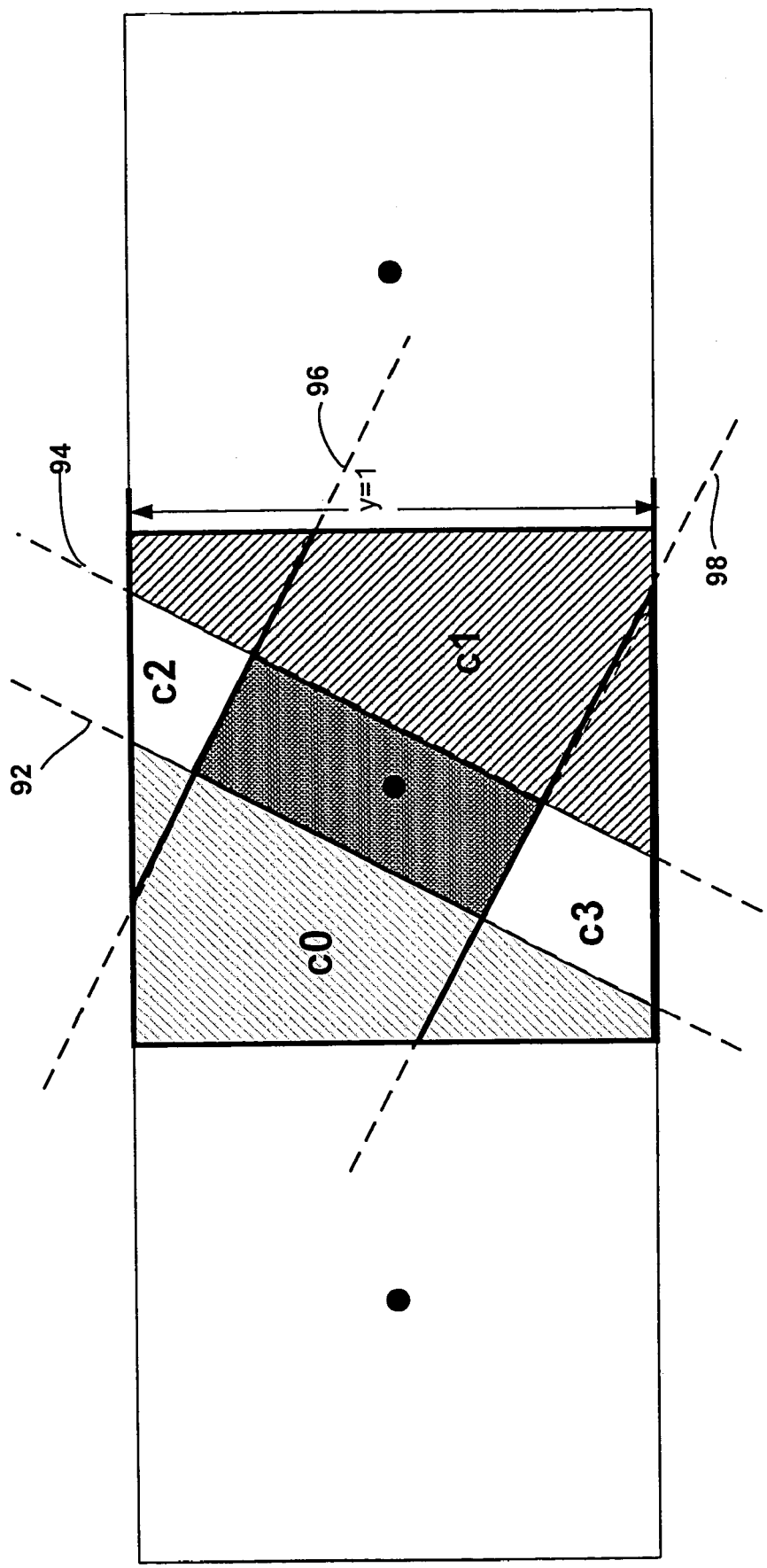
FIG. 5 shows a non-zero thickness line covering pixels in the output device such that four edges of a line may be present in at least one of the pixels.

To determine the fractional area f of coverage of a pixel, several cases must be considered. These cases include a single edge 90 in FIG. 3 of the line traversing a pixel (case I), two parallel edges 92 94 in FIGS. 4A, 4B of the line traversing a pixel (case II), two edges 92, 96 in FIGS. 4A, 4B of the line, orthogonal to each other, traversing the pixel (case III), and three edges 92, 94, 96 in FIG. 4B (case IV) or four edges 92, 94, 96, 98 in FIG. 5 traversing a pixel (case V). If c0 is the area not covered by the line when one edge traverses a pixel, then 1−c0 is the area covered in case I. If c0 and c1 are the areas not covered by the line when two parallel edges, respectively traverse the pixel, then the area covered is (1−(c0+c1)). If c0 and c2 are the areas not covered by the line when two orthogonal edges, respectively traverse the pixel, then the area covered can be approximated as (1−c0)*(1−c2). At the pixels near the end of the line segment, it may be true that three edges of the line traverse a pixel, such as is shown in FIG. 4B. In this case, if c2 is the area not covered by the third edge and c0 and c1 are defined as in cases I and II, then the area covered can be approximated as (1−(c0+c1))*(1−c2). Finally, in the rare case, FIG. 5, when four edges of a line traverse a pixel, and c3 is defined as the area not covered by the fourth edge, and the other edges are as defined in cases I, II and III, then the area covered can be approximated as (1−(c0+c1))*(1−(c2+c3)). In cases III, IV and V, the formulas for coverage are an approximation that is sufficiently accurate for the purposes involved. It is desirable to limit the range of areas c0, c1, c2, and c3 to the interval of [0,1]. This allows the formulas to be used on all four edges without an SIMD processor having to determine whether the edge is alongside or perpendicular to line direction and without the need for branching or testing of conditions. A simplification of the above in one embodiment includes assuming that the coverage calculation for the two edges perpendicular to the line direction is skipped and the corresponding areas are zero when performance is more important than the quality of appearance of the line.

From the above, it is clear that if the coverage of a pixel by a single line edge can be determined, the coverage for the others cases can be derived, as they are just similar applications of the coverage of a pixel by one line edge.

The determination of the coverage of a pixel by a line when a single line edge traverses the pixel requires that two cases be considered. The first case is when the edge traverses the pixel so as to cover only a triangular portion 100, in FIG. 6, of the pixel. The second case to consider is when the edge traverses the pixel so as to cover both a triangular portion 100 and a parallelogram portion 102 in FIG. 6.

When the line edge carves out a triangular portion of the pixel, the area $A_0$ covered by the line is given by $$\frac{1}{2}\Delta x \cdot \Delta y,$$

where $\Delta x$ is the base of the triangle and $\Delta y$ is the height of the triangle 100, as shown in FIG. 6. Of course, $\Delta x$ and $\Delta y$ are related by the edge equation of the line. In particular, if $\Delta y = m\,\Delta x$, and $\Delta x = p/sf$, then the equation for the area becomes $$A_0 = \frac{1}{2}m \cdot (p/sf)^2, \text{ or}$$

$$A_0 = \frac{1}{2}p^2 \cdot (1-sf)^{-1} \cdot sf^{-1},$$

which is a form particularly well suited for computation in a graphics pipeline described below.

When the edge of the non-zero thickness line carves out both a triangle 100 and a parallelogram 102, the area of the parallelogram must be determined and added to the maximum area of the triangle to determine the area of coverage. The maximum area of the triangle 100, assuming that $\frac{1}{2} \leq sf \leq 1$, occurs when p=(1−sf), and is $$\max(A_0) = \frac{1}{2m} = \frac{1}{2}(1-sf) \cdot sf^{-1},$$

where it is assumed that the area of a whole pixel is unity, each side of the pixel being unity. The area $A_1$ of the parallelogram 102 is $$\Delta x_\| = \Delta x_{TOT} - \frac{1}{m} = p \cdot sf^{-1} + (1 - sf^{-1}),$$

because its height is unity. The maximum area $\max(A_1)$ of the parallelogram 102 is $1-1/m$. The maximum area of both is $$\max(A_0)+\max(A_1)=1-(1+sf)(2sf)^{-1}.$$

Alternatively, the above formulas may be expressed as a conditional function of p:

if $0 \leq p \leq (1 - sf)$, then $A(p) = \frac{1}{2}p^2 \cdot (1-sf)^{-1} \cdot sf^{-1})$ if $(1-sf) < p \leq 1$, then $$A(p) = \frac{1}{2}(1-sf)^2 \cdot (1-sf)^{-1} \cdot sf^{-1} + p \cdot sf^{-1} + (1-sf^{-1}).$$

The remaining area of the pixel is just the remaining triangle $A_2$ 104, whose area is again $$\frac{1}{2m}.$$

Thus, if the area covered is greater than $\max(A_0)+\max(A_1)$, the area of coverage is obtained by computing the triangular area, $$A_2 = \frac{1}{2}r^2 \cdot (1-sf)^{-1} \cdot sf^{-1}$$

and by subtracting it from 1, to give $1-A_2$, where the distance $\Delta x$ in the parameter r, is measured from the left side of the pixel, thus r=1−p. Therefore, the area of coverage is then, $$A_3 = (1 - A_2) = 1 - \frac{1}{2}(1-p)^2 \cdot (1-sf)^{-1} \cdot sf^{-1}.$$

The conditional formulas for the case when $0 \leq sf \leq 1/2$ are:

if $0 \leq p \leq sf$, then $A(p) = \frac{1}{2} p^2 \cdot (1-sf)^{-1} \cdot sf^{-1}$, and if $sf < p \leq 1$, then $A(p) = \frac{1}{2} sf^2 \cdot (1-sf)^{-1} \cdot sf^{-1} + p \cdot sf^{-1} + (1-sf^{-1})$.

As can be observed, if sf is greater than ½ then the limits on p in the conditional are (1−sf) and if sf is less than ½, the limits on p are sf. Therefore, the limits on p are always the min(sf, 1−sf). This suggest a way to combine the conditional formulas for both cases:

if $0 \leq p \leq \min(sf, 1-sf)$, then $A(p = \min(sf, 1-sf)) = \frac{1}{2} p^2 \cdot (1-sf)^{-1} \cdot sf, -1$, and if $\min(sf, 1-sf) < p \leq 1$, then $A(p = \min(sf, 1-sf)) =$ $$\frac{1}{2} sf^2 \cdot (1-sf)^{-1} \cdot sf^{-1} + p \cdot sf^{-1} + (1-sf^{-1}).$$

Referring to FIG. 6, in one embodiment calculating a displacement Δx in the x-direction into a pixel when an edge of a line segment passes through coordinates ($x_c$, $y_c$) in the pixel 82, includes evaluating the edge relation $ax+by+c \geq 0$ at (x', y'), $$P_{(x',y')} = ax' + by' + c,$$

with y'=$y_c$, and with x'=$x_c$+Δx. Therefore, $$P_{(x',y')} = ax_c + by_c + c + a\Delta x.$$

Because the edge of the line traversing the pixel actually passes through coordinates ($x_c$, $y_c$) in the pixel, $$ax_c + by_c + c = 0.$$

Therefore, the edge relation being evaluated reduces to $$P_{(x',y')} = a\Delta x.$$

The edge relation $ax+by+c \geq 0$ evaluated at (x', y') can also be expressed in terms of the coordinates of the center ($x_0$, $y_0$) of the pixel as $$P_{(x',y')} = ax_0 + by_0 + c + \frac{a+b}{2},$$

where the equality x'=$x_0$+(a+b)/2a has been substituted into the above equation, the y values being the same. Therefore, setting the two versions of the edge relation equal to each other, gives $$P_{(x',y')} = a\Delta x = ax_0 + by_0 + c + \frac{a+b}{2},$$

which can be used to solve for Δx, $$\Delta x = \frac{ax_0 + by_0 + c + (a+b)/2}{a},$$

In this case, a>0, b>=0 is assumed. Thus, the displacement Δx for a given pixel is a function of constants and the parameters a, b and c.

When the edge traverses (touches) the pixel, the displacement Δx is in the range of [0, 1+b/a], and aΔx is in the range of [0, a+b], assuming that a>0, b≧0. It is desirable to scale −($P_{(x',y')}$=aΔx) to be in the range of [0,1], by multiplying the above equation by (1/(a+b)), Thus, $$p = P_{scaled} = a\Delta x/(a+b) = ax_0/(a+b) + by_0/(a+b) + c/(a+b) + 1/2.$$

This makes it easier to use existing interpolation logic to perform the calculation. For all other cases, $$p = ax_0/(|a|+|b|) + by_0/(|a|+|b|) + c/(|a|+|b|) + 1/2$$

which expressed in terms of sf becomes:

$$p = sf \cdot x_0 + (1-sf) \cdot y_0 + sf \cdot c/a + 1/2$$

Figure 7:
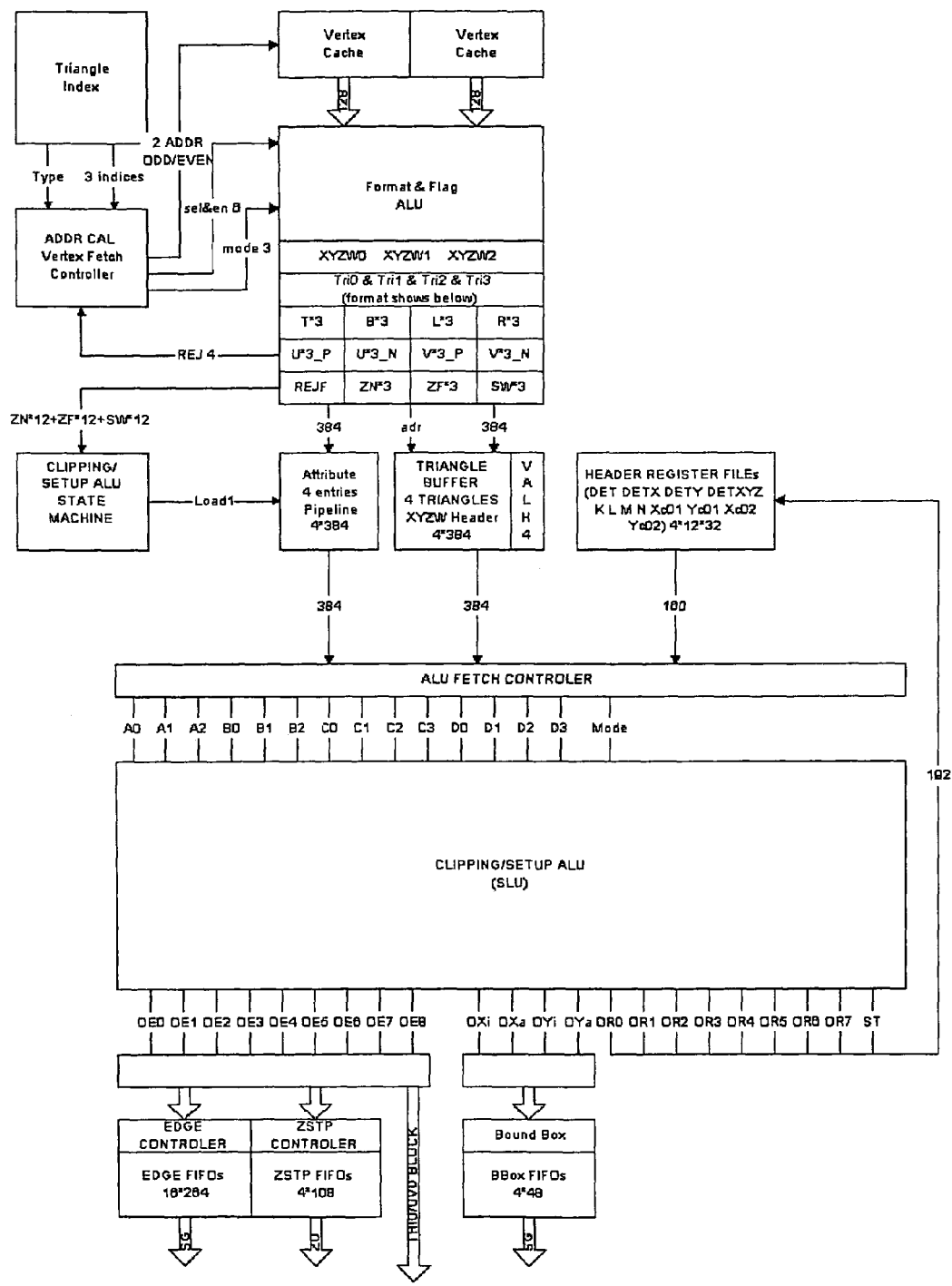
FIG. 7 shows a block diagram of the graphics pipeline used to implement the above computations.

FIG. 7 shows a block diagram of the graphics pipeline used to carry out the above computations. An interpolator is used to compute the parameter p=sf·Δx, which is a function of the x-distance spanned by the area covered by the line edge, based on the general formula $P = P_s + P_x \cdot x + P_y \cdot y$, which the interpolator implements to compute the shading of triangles. Matching like terms requires that $P_x$=sf, $P_y$=(1−sf), and $$P_s = sf \frac{c}{a} + 1/2,$$

in the interpolator formula.

If the computed parameter p is negative, it is clamped to zero, and the pixel is not covered or touched by the line edge. If the result is in the range of [0,1], the pixel is touched by the edge and the result is used to calculate the area of coverage in the pixel shader. If the result is greater than 1, it is clamped to 1, and the pixel is 100% covered by the line edge.

The interpolator is a fixed function SIMD processor capable of operating on multiple data items with the same instruction. An instruction-based shader is then used to compute the coverage area based on the x-spanned distance, in accordance with the above formulas.

Figure 8:
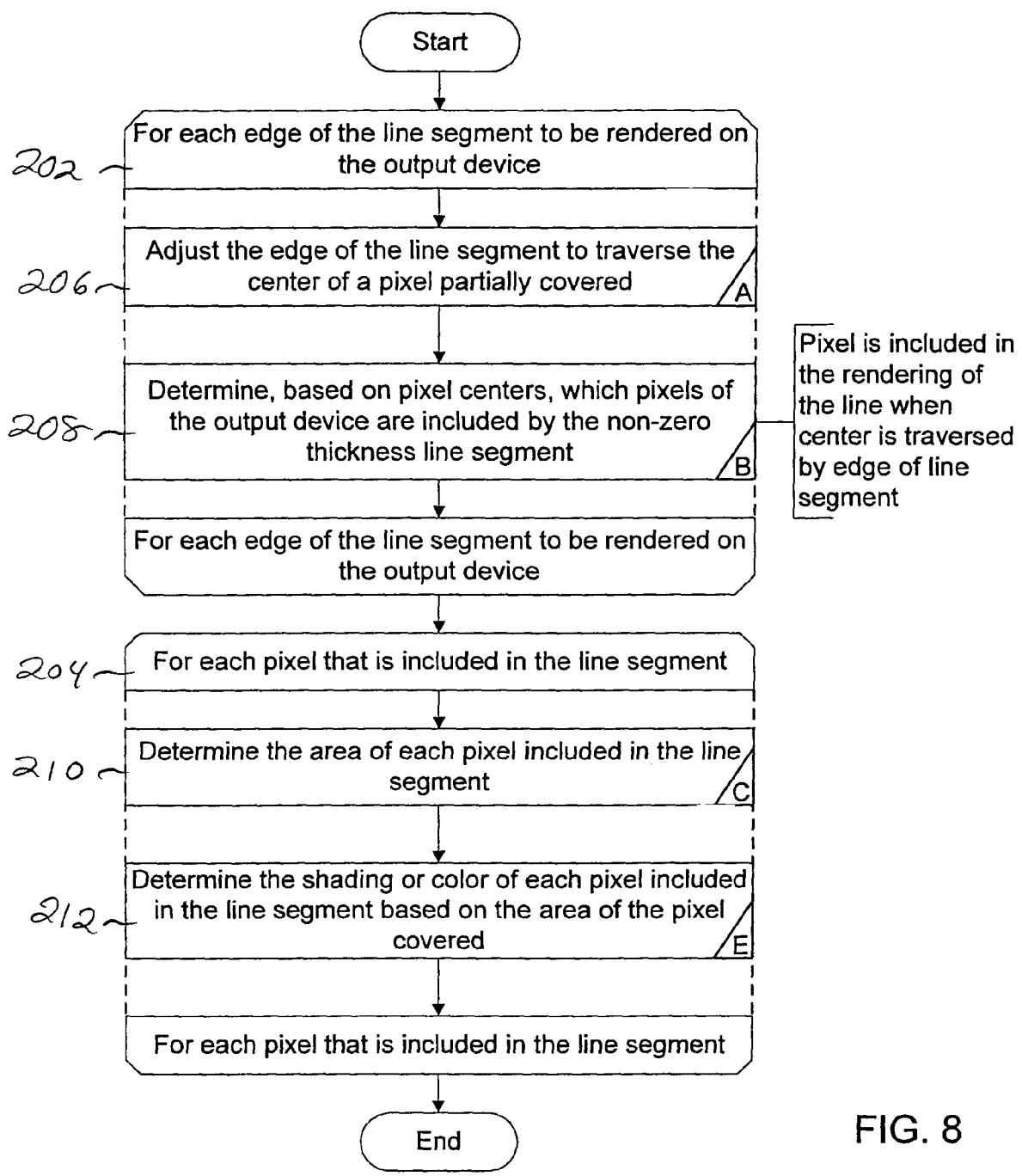
FIG. 8 is a flow chart showing a method in accordance with the present invention of rendering a line segment on an output device with reduced aliasing.

FIG. 8 is a flow chart showing a method in accordance with the present invention of rendering a line segment on an output device with reduced aliasing. There are two loops in the method. The first loop 202 expands the edges of the line segment to include pixels that are touched but do not have their centers covered by the line segment. The second loop 204 determines the shading or coloring of each pixel that is included in the expanded line segment.

The first loop 202 includes the step 206 of adjusting the edge of the line segment to traverse the center of a pixel partially covered and the step 208 of determining, based on the pixel centers, which pixels of the output device are included in the non-zero thickness line segment. The second loop includes the step 210 of determining the area covered of each pixel included in the expanded line segment, and the step 212 of determining the shading or color of the pixel based on the area.

Figure 9:
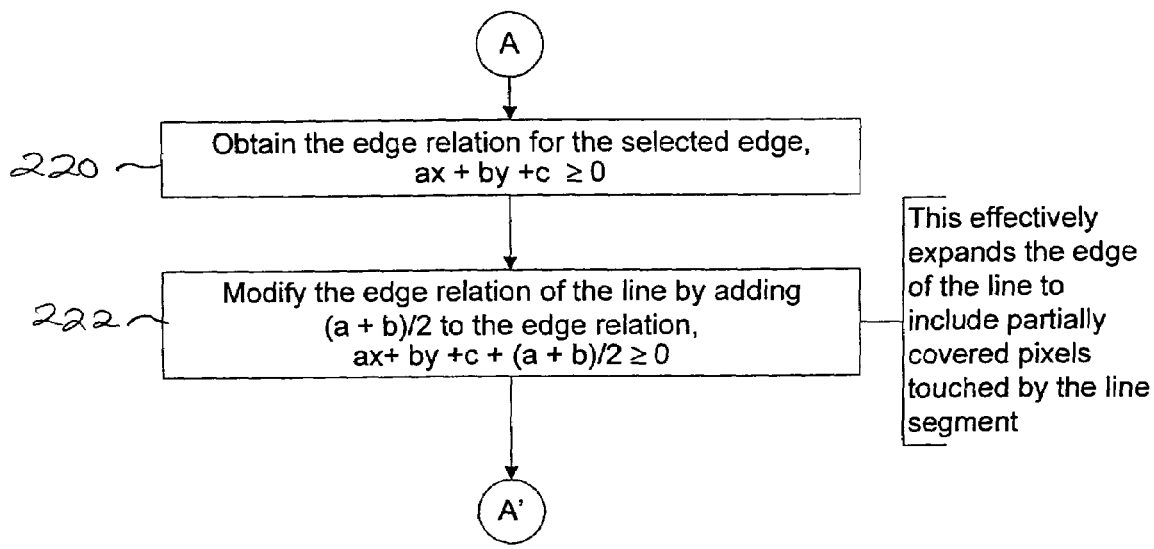
FIG. 9 is a flow chart showing the steps for carrying out the adjustment of the edge of the line segment.

FIG. 9 is a flow chart showing the steps for carrying out the adjustment of the edge of the line segment, step 206. In FIG. 9, label A is the entry and label A' is the return. First, the edge relation for the selected edge is obtained in step 220 and the edge is adjusted by adding, in step 222, a quantity (|a|+|b|)/2 to the edge relation. This effectively expands the edge to include pixels touched but with centers not covered.

Figure 10:
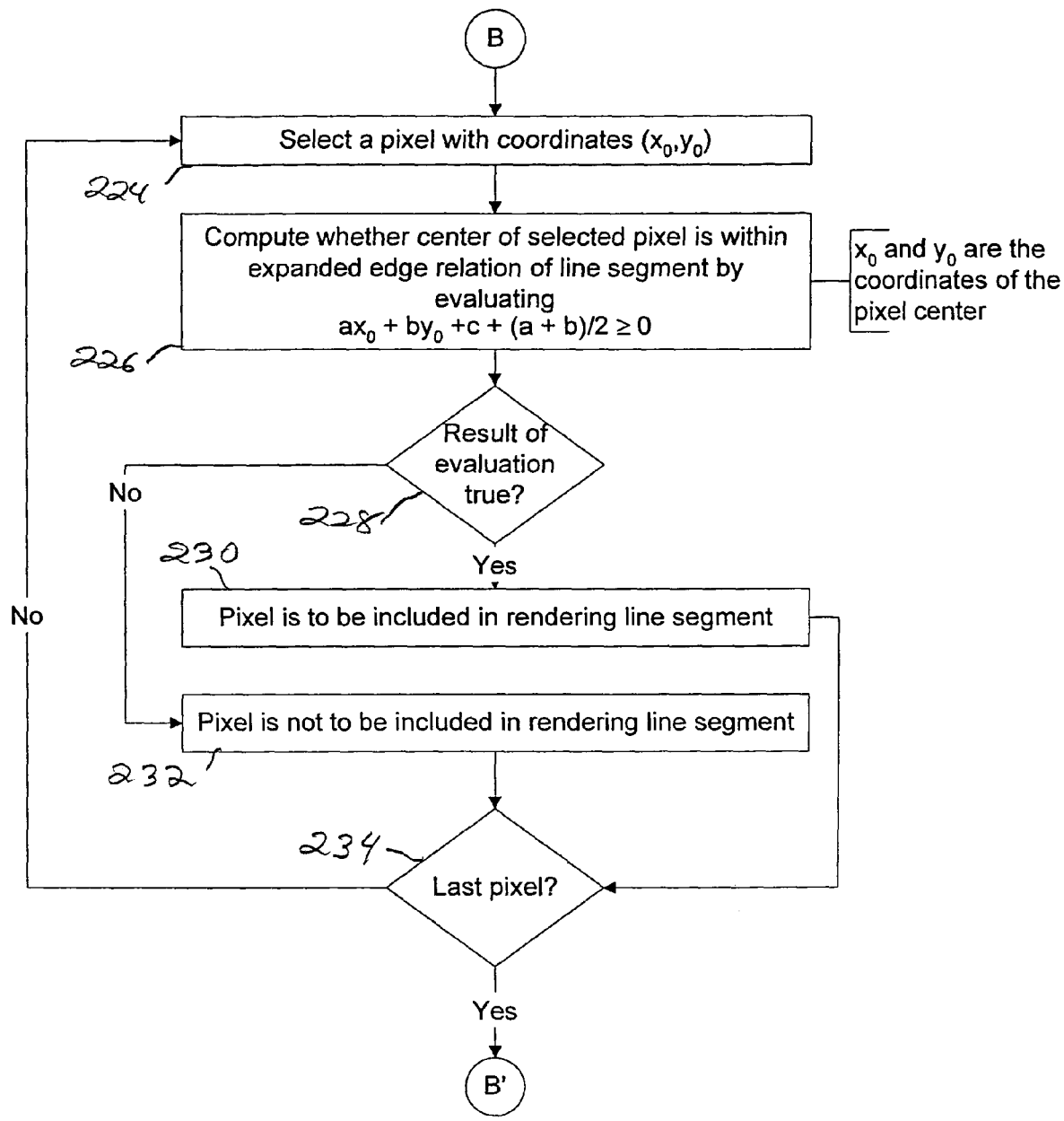
FIG. 10 is a flow chart showing the steps for determining the pixels to be included in the rendering of the expanded line segment.

FIG. 10 is a flow chart showing the steps for determining the pixels to be included in the rendering of the expanded line segment, step 208. First, a pixel is selected, in step 224 and the coordinates of its center are determined. Next, in step 226, using the coordinates the edge relation of the expanded line is evaluated. If the result is true, as determined in step 228, meaning that the evaluated expression is greater than or equal to zero, the pixel is determined to be included, in step 230, in the line segment. Otherwise, in step 232, it is not included. This continues for all of the selected pixels, as determined by step 234.

Figure 11:
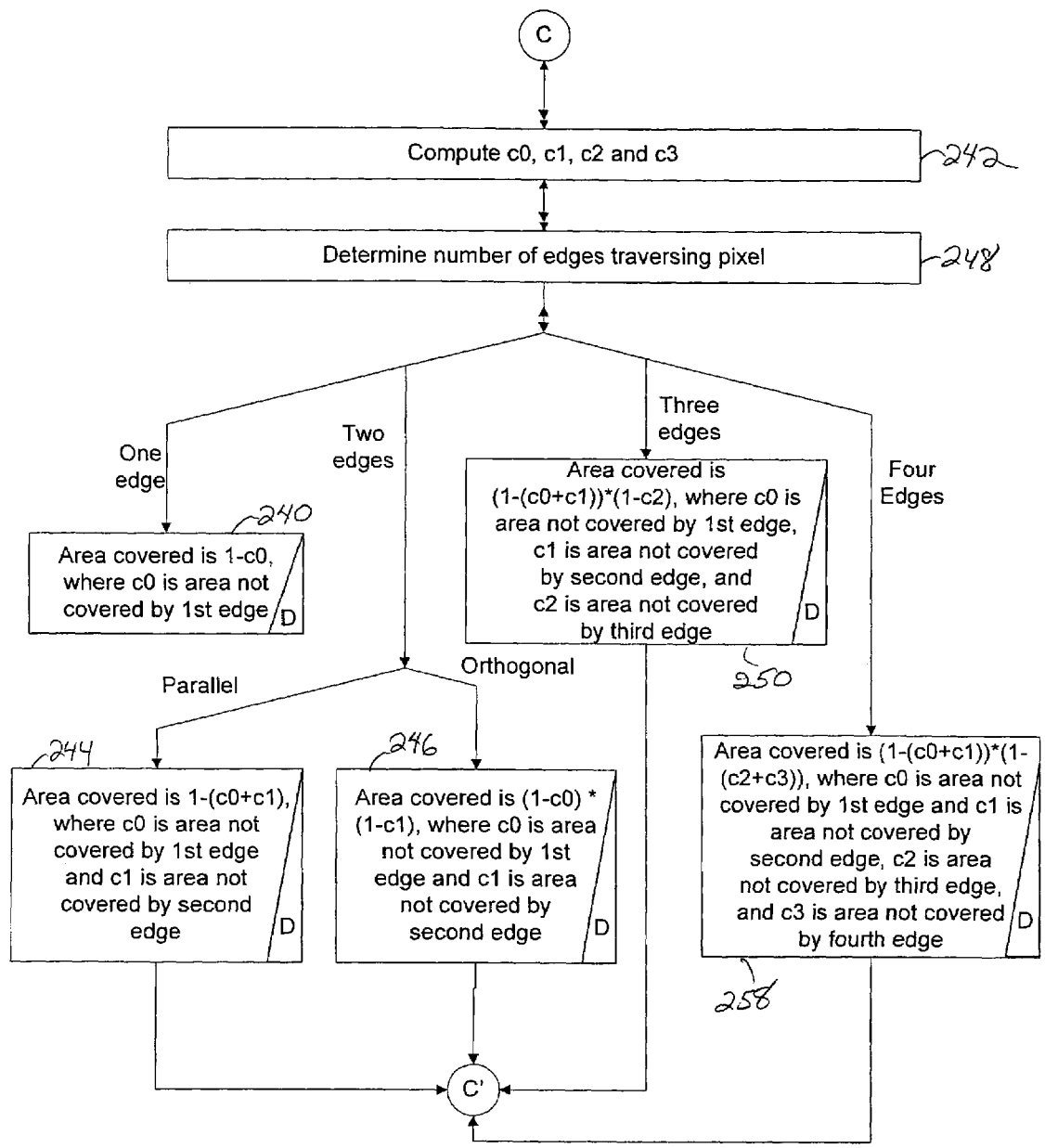
FIG. 11 is a flow chart showing the steps for determining the area of a pixel covered by the expanded line segment.

FIG. 11 is a flow chart showing the steps for determining the area of a pixel covered by the original line segment, step 210. First, all four parameters, c0, c1, c2 and c3 are computed in step 242. Then, based on the number of edges traversing the pixel, (i.e., depending on which parameters are non-zero) as determined in step 248, the area covered is computed. In step 240, the area covered, when one edge traverses the pixel, is computed. In step 244, the area covered, when two parallel edges traverse the pixel, is computed. In step, 246, the area covered when one edge and another orthogonal edge traverse the pixel, is computed. In step 250, the area covered when three edges traverse the pixel, is computed. In step 258, the area covered when four edges traverse the pixel, is computed. Each of the steps 240, 244, 246, 250, and 258 relies on the steps of FIG. 12 to compute the relevant area.

Figure 12A:
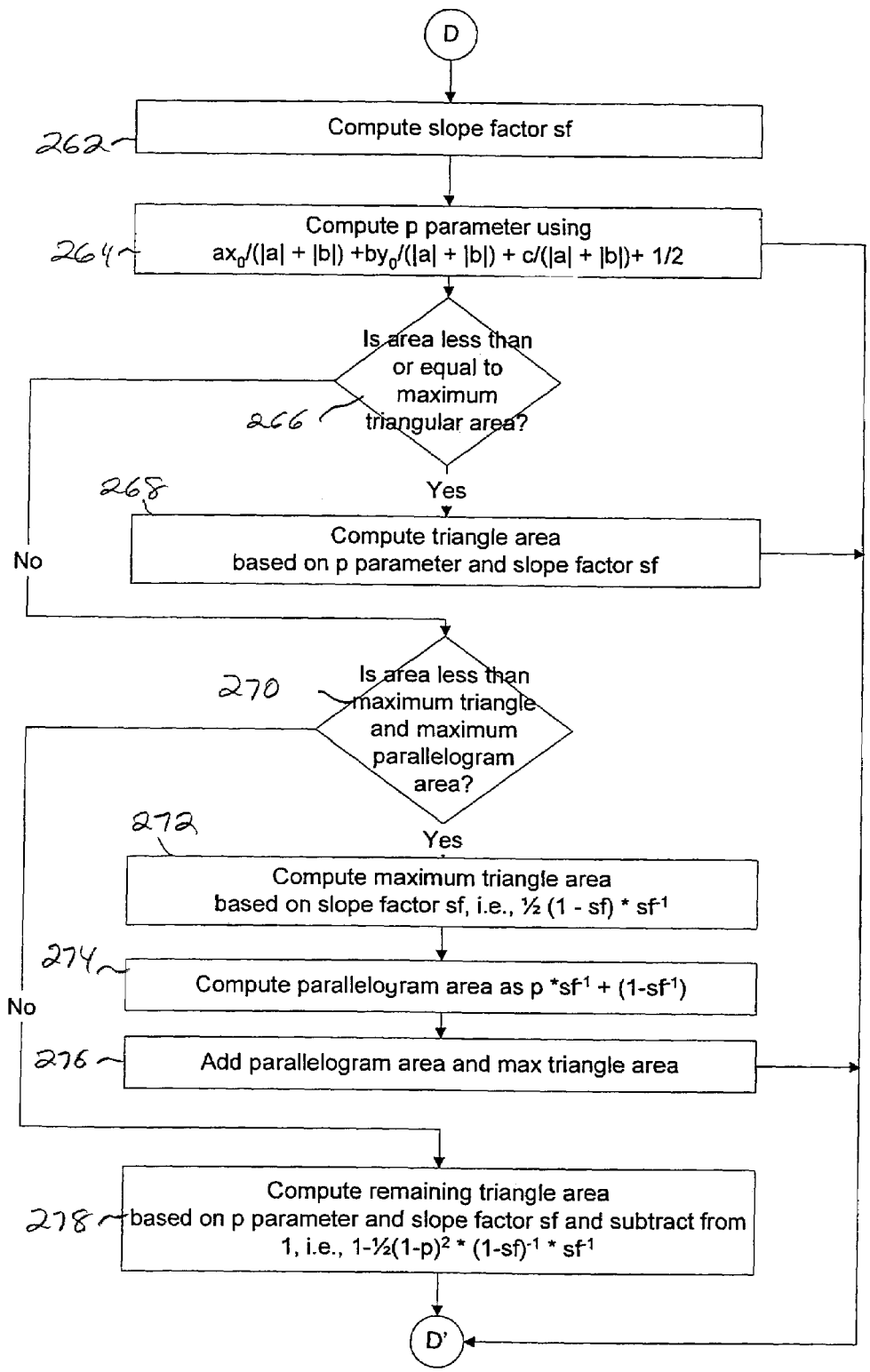
FIG. 12A is a flow chart showing the steps for determining the area covered by an edge traversing a pixel.

FIG. 12A is a flow chart showing the steps for determining the area covered by an edge traversing a pixel. First, p is calculated in pixel calculation block (fixed function interpolator), then in programmable pixel shader, the pixel coverage is calculated based on the four parameters c0, c1, c2, c3. Each of the steps in FIG. 11 uses the steps of FIG. 12 to determine the area covered by the edge in question. First, a slope factor sf is computed in step 262, followed by a computation for the parameter p in step 264. The parameter p computation uses the formula $p=ax_0/(|a|+|b|)+by_0/(|a|+|b|)+c/(|a|+|b|)+½$, determined in step 266, the area is less than the maximum triangular area, the triangular area is computed, in step 268, using the parameter p and the slope factor sf. If the area is greater than the maximum triangular area but less than the sum of the maximum triangular area and maximum parallelogram area, as determined in step 270, or alternatively if $0<=p<(1-sf)$, then the parallelogram area is computed in step 274 and added to the maximum triangular area in step 276, which is computed in step 272. If the area is greater than the maximum triangular area and maximum parallelogram area, as determined in step 270, then the remaining triangular area is computed and subtracted from one, in step 278. The result is the area of a pixel covered by an edge traversing the pixel.

Figure 12B:
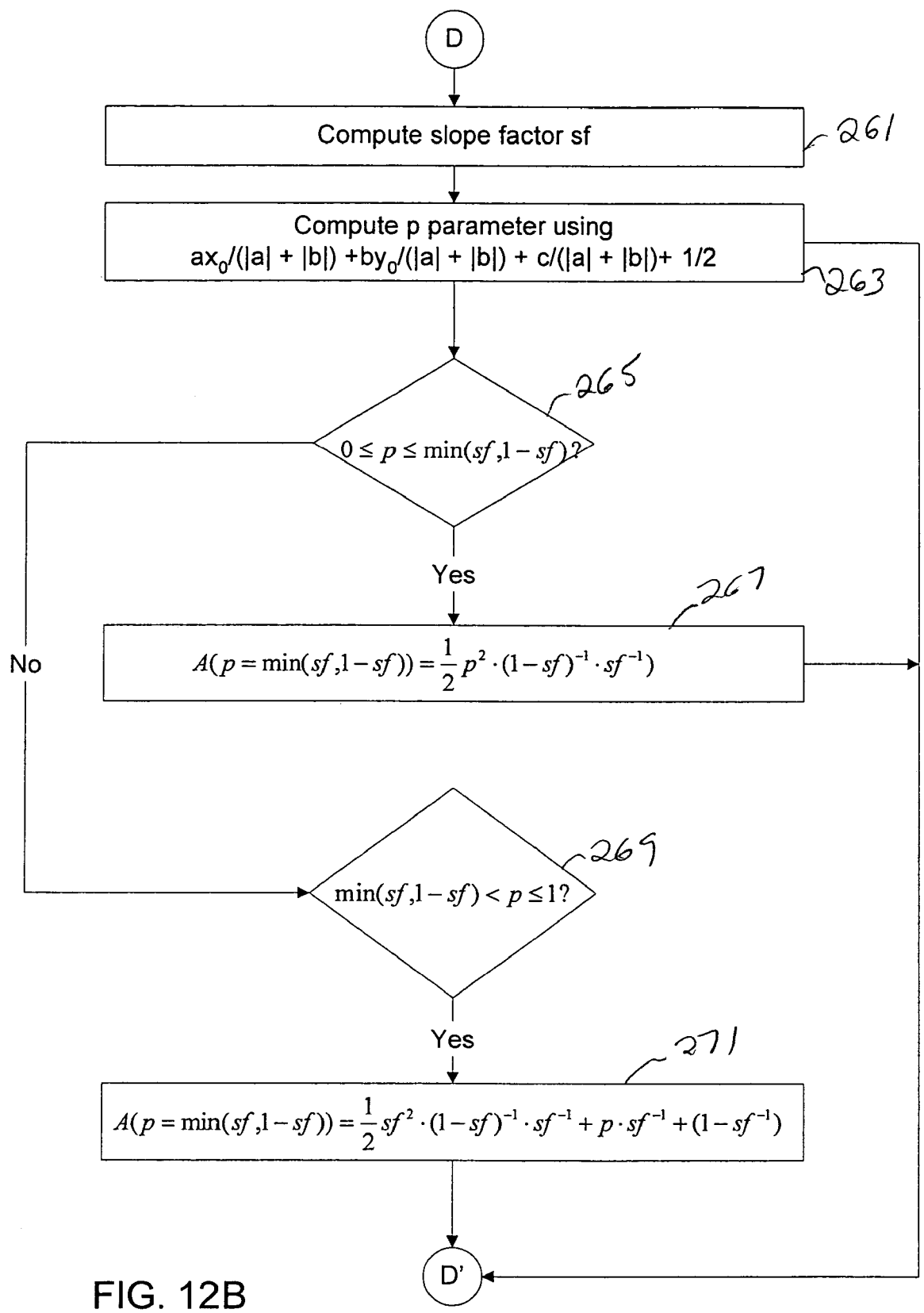
FIG. 12B is a flow chart showing the steps of an alternative method for determining the area covered by an edge traversing a pixel.

FIG. 12B is a flow chart showing an alternative method for computing the area of a pixel covered by an edge traversing the pixel. In step 261, the slope factor sf is computed and in step 263, the p parameter is computed. In step 265, a determination is made as to whether the p parameter is between 0 and min(sf, 1−sf). If so, then the area is computed according to step 267. If not, i.e., p is between min(sf, 1−sf) and 1 (as determined in step 269), then the area is computed according to step 271.

Figure 13:
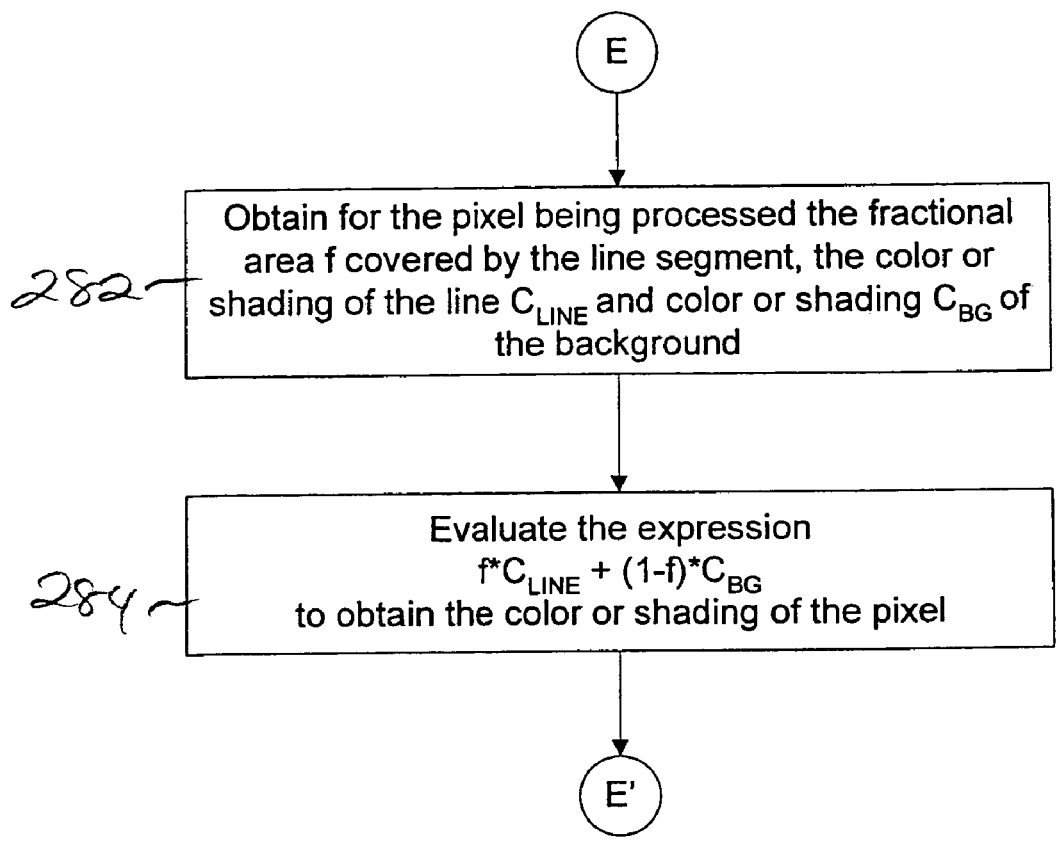
FIG. 13 is a flow chart showing the step for determining the shading or color value of a pixel after determining the area of the pixel covered by the line segment.

FIG. 13 is a flow chart showing the step for determining the shading or color value of a pixel after determining the area of the pixel covered by the line segment. In step 282, the fractional area covered and the colors or shadings of the line and background are obtained. In step 284, a linear interpolation calculation is performed to obtain the shading or color of the pixel.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method in a computer graphics system for rendering and displaying on an output device, having a finite number of pixels, a non-zero thickness line segment with reduced aliasing, comprising:

expanding an edge of the line segment touching but not covering a pixel center of the line segment to be rendered on the output device so that the expanded line segment covers the center of the pixel touched;

determining, using the pixel centers, the pixels to be included in the expanded line segment, the line segment being distinguishable from a background over which said line segment is rendered by having a shade different from a shade of the background;

for each pixel that is included in said non-zero thickness expanded line segment, determining the area of the pixel partially or fully covered by said line segment, and based on the area of the pixel covered, determining a shading value for the pixel by interpolating between the shade of said line segment and the shade of the background; and displaying on the output device the reduced-aliased line segment;

wherein the output device has a x-y coordinate system established thereon and the pixels of the output device each have centers with an x-y coordinate;

wherein an edge of said line segment has an equation $ax+by+c=0$; and wherein the step of expanding an edge includes altering the equation of an edge of said line segment by adding an amount (|a|+|b|)/2 to the c parameter of the equation, where a, b and c are coefficients of the equation $ax+by+c=0$ of the edge of the line segment.

2. A method in a computer graphics system for rendering and displaying on an output device, having a finite number of pixels, a non-zero thickness line segment with reduced aliasing, comprising:

expanding an edge of the line segment touching but not covering a pixel center of the line segment to be rendered on the output device so that the expanded line segment covers the center of the pixel touched;

determining, using the pixel centers, the pixels to be included in the expanded line segment, the line segment being distinguishable from a background over which said line segment is rendered by having a shade different from a shade of the background;

for each pixel that is included in said non-zero thickness expanded line segment, determining the area of the pixel partially or fully covered by said line segment, and based on the area of the pixel covered, determining a shading value for the pixel by interpolating between the shade of said line segment and the shade of the background; and displaying on the output device the reduced-aliased line segment;

wherein the output device has a x-y coordinate system established thereon and the pixels of the output device each have centers with an x-y coordinate;

wherein an edge of an expanded line segment has an equation describing the edge; and wherein the step of determining the pixels to be included in the non-zero thickness line includes:

evaluating the equation of an edge of said expanded line segment with the x and y-coordinates of the center of each pixel; and testing whether the result of the computation is greater than or equal to zero; and wherein evaluating the equation of an edge of said expanded line segment with the x and y-coordinates of the center of each pixel includes computing $ax_0+by_0+c+(|a|+|b|)/2$, where $x_0$ and $y_0$ are the coordinates of the pixel center and a, b and c are coefficients of the equation $ax+by+c=0$ of the edge of the line segment.

3. A method in a computer graphics system for rendering and displaying on an output device, having a finite number of pixels, a non-zero thickness line segment with reduced aliasing, comprising:

expanding an edge of the line segment touching but not covering a pixel center of the line segment to be rendered on the output device so that the expanded line segment covers the center of the pixel touched;

determining, using the pixel centers, the pixels to be included in the expanded line segment, the line segment being distinguishable from a background over which said line segment is rendered by having a shade different from a shade of the background; and for each pixel that is included in said non-zero thickness expanded line segment, determining the area of the pixel partially or fully covered by said line segment, and based on the area of the pixel covered, determining a shading value for the pixel by interpolating between the shade of said line segment and the shade of the background; and displaying on the output device the reduced-aliased line segment;

wherein the output device has a x-y coordinate system established thereon and said line segment has a slope factor sf related to the slope of said line segment and a parameter p proportional to an x-distance between an edge of said line segment traversing a pixel and a pixel boundary; and wherein, for an edge of said line segment that traverses a partially covered pixel so as to define a triangular area, the step of determining the area of a partially covered pixel includes:

determining that the area covered is less than or equal to a first predetermined limit; and computing the triangular area covered by said line segment.

4. A method for rendering and displaying a non-zero thickness line as recited in claim 3, wherein the parameter p is equal to the product of the slope factor sf and the distance between an edge of said line segment traversing the pixel and a pixel boundary;

wherein the line segment has a slope m and the slope factor sf equals $m/(m+1)$; and wherein the step of computing the triangular area covered by said line segment includes forming a product $½*p^2*(1-sf)^{-1}*sf^{-1}$ to find the area.

5. A method in a computer graphics system for rendering and displaying on an output device, having a finite number of pixels, a non-zero thickness line segment with reduced aliasing, comprising:

expanding an edge of the line segment touching but not covering a pixel center of the line segment to be rendered on the output device so that the expanded line segment covers the center of the pixel touched;

determining, using the pixel centers, the pixels to be included in the expanded line segment, the line segment being distinguishable from a background over which said line segment is rendered by having a shade different from a shade of the background; and for each pixel that is included in said non-zero thickness expanded line segment, determining the area of the pixel partially or fully covered by said line segment, and based on the area of the pixel covered, determining a shading value for the pixel by interpolating between the shade of said line segment and the shade of the background; and displaying on the output device the reduced-aliased line segment;

wherein the output device has an x-y coordinate system established thereon and said line segment has a slope factor sf related to the slope of said line segment and a parameter p proportional to an x-directed distance between an edge of said line segment traversing a pixel and a pixel boundary; and wherein, for an edge of said line segment that traverses a partially covered pixel so as to define a maximum triangular area and a parallelogram area, the step of determining the area of a partially covered pixel includes:

determining that the area covered is greater than a first predetermined limit;

computing the maximum triangular area covered by said line segment;

computing the area of a parallelogram covered by said line segment; and computing the sum of the maximum triangular area and the parallelogram area.

6. A method for rendering and displaying a non-zero thickness line as recited in claim 5, wherein the slope factor sf equals $m/(m+1)$, where m is the slope of said line segment.

7. A method for rendering and displaying a non-zero thickness line as recited in claim 5, wherein the p parameter equals the product of said x-directed distance and the slope factor sf.

8. A method for rendering and displaying a non-zero thickness line as recited in claim 7, wherein said x-directed distance is computed as the quotient $ax_0+by_0+c+(|a|+|b|)/2$ and a, where $x_0$ and $y_0$ are the coordinates of the center of the pixel and the line segment edge has an equation $ax+by+c=0$ and a, b and c are coefficients of the equation.

9. A method for rendering and displaying a non-zero thickness line as recited in claim 5, wherein the first predetermined limit is the maximum triangular area covered by said line segment traversing through the pixel.

10. A method for rendering and displaying a non-zero thickness line as recited in claim 5, wherein the step of computing the maximum triangular area covered by said line segment includes forming a product $½*(1-sf)*sf^{-1}$ to find the maximum triangular area.

11. A method for rendering and displaying a non-zero thickness line as recited in claim 5, wherein the step of computing the parallelogram area covered by said line segment includes forming a sum of $p*sf^{-1}$ and $(1-sf^{-1})$ to find the parallelogram area.

12. A method in a computer graphics system for rendering and displaying on an output device, having a finite number of pixels, a non-zero thickness line segment with reduced aliasing, comprising:

expanding an edge of the line segment touching but not covering a pixel center of the line segment to be rendered on the output device so that the expanded line segment covers the center of the pixel touched;

determining, using the pixel centers, the pixels to be included in the expanded line segment, the line segment being distinguishable from a background over which said line segment is rendered by having a shade different from a shade of the background; and for each pixel that is included in said non-zero thickness expanded line segment, determining the area of the pixel partially or fully covered by said line segment, and based on the area of the pixel covered, determining a shading value for the pixel by interpolating between the shade of said line segment and the shade of the background; and displaying on the output device the reduced-aliased line segment;

wherein, for an edge of said line segment that traverses a partially covered pixel, the step of determining the area of a partially covered pixel includes:

determining that the area covered is greater than a second predetermined limit, leaving a triangular area not covered;

computing the triangular area not covered by said line segment; and computing the difference between unity and the triangular area not covered to find the area of the pixel covered.

13. A method for rendering and displaying a non-zero thickness line as recited in claim 12, wherein the second predetermined limit is the sum of the maximum triangular area and the maximum parallelogram area of said line segment traversing the pixel.

14. A method for rendering and displaying a non-zero thickness line as recited in claim 12, wherein the line segment has a slope m and the slope factor sf equals m/(m+1) and the parameter p is equal to the product of the slope factor sf and the distance between an edge of said line segment traversing the pixel and a pixel boundary; and wherein the step of computing the triangular area not covered by said line segment includes forming a product $½*p^2*(1-sf)^{-1}*sf^{-1}$ to find the triangular area not covered.

15. A method in a computer graphics system for rendering and displaying on an output device, having a finite number of pixels, a non-zero thickness line segment with reduced aliasing, comprising:

expanding an edge of the line segment touching but not covering a pixel center of the line segment to be rendered on the output device so that the expanded line segment covers the center of the pixel touched;

determining, using the pixel centers, the pixels to be included in the expanded line segment, the line segment being distinguishable from a background over which said line segment is rendered by having a shade different from a shade of the background; and for each pixel that is included in said non-zero thickness expanded line segment, determining the area of the pixel partially or fully covered by said line segment, and based on the area of the pixel covered, determining a shading value for the pixel by interpolating between the shade of said line segment and the shade of the background; and displaying on the output device the reduced-aliased line segment;

wherein when two parallel edges of said line segment traverse a partially covered pixel, the step of determining the area of the partially covered pixel includes;

computing a first area of the pixel not covered by the first parallel edge;

computing a second area of the pixel not covered by the second edge; and summing the first and second areas and subtracting the sum from one.

16. A method in a computer graphics system for rendering and displaying on an output device, having a finite number of pixels, a non-zero thickness line segment with reduced aliasing, comprising:

expanding an edge of the line segment touching but not covering a pixel center of the line segment to be rendered on the output device so that the expanded line segment covers the center of the pixel touched;

determining, using the pixel centers, the pixels to be included in the expanded line segment, the line segment being distinguishable from a background over which said line segment is rendered by having a shade different from a shade of the background; and for each pixel that is included in said non-zero thickness expanded line segment, determining the area of the pixel partially or fully covered by said line segment, and based on the area of the pixel covered, determining a shading value for the pixel by interpolating between the shade of said line segment and the shade of the background; and displaying on the output device the reduced-aliased line segment;

wherein, when a first edge along said line segment and a second edge orthogonal to said line segment traverse a partially covered pixel, the step of determining the area of the partially covered pixel includes:

computing a first area of the pixel not covered by the first parallel edge and subtracting the first area from one to form a first difference;

computing a second area of the pixel not covered by the second edge and subtracting the second area from one to form a second difference; and forming a product of the first and second differences.

17. A method in a computer graphics system for rendering and displaying on an output device, having a finite number of pixels, a non-zero thickness line segment with reduced aliasing, comprising:

expanding an edge of the line segment touching but not covering a pixel center of the line segment to be rendered on the output device so that the expanded line segment covers the center of the pixel touched;

determining, using the pixel centers, the pixels to be included in the expanded line segment, the line segment being distinguishable from a background over which said line segment is rendered by having a shade different from a shade of the background; and for each pixel that is included in said non-zero thickness expanded line segment, determining the area of the pixel partially or fully covered by said line segment, and based on the area of the pixel covered, determining a shading value for the pixel by interpolating between the shade of said line segment and the shade of the background; and displaying on the output device the reduced-aliased line segment;

wherein, when two parallel edges and a third orthogonal edge of said line segment traverse a partially covered pixel, the step of determining the area of the partially covered pixel includes:

computing a first area of the pixel not covered by the first parallel edge;

computing a second area of the pixel not covered by the second parallel edge;

summing the first and second areas and subtracting the sum from one to form a first difference;

computing the third area of the pixel not covered by the third orthogonal edge and subtracting the third area from one to form a second difference; and forming a product of the first difference and the second difference.

18. A method in a computer graphics system for rendering and displaying on an output device, having a finite number of pixels, a non-zero thickness line segment with reduced aliasing, comprising:

expanding an edge of the line segment touching but not covering a pixel center of the line segment to be rendered on the output device so that the expanded line segment covers the center of the pixel touched;

determining, using the pixel centers, the pixels to be included in the expanded line segment, the line segment being distinguishable from a background over which said line segment is rendered by having a shade different from a shade of the background; and for each pixel that is included in said non-zero thickness expanded line segment, determining the area of the pixel partially or fully covered by said line segment, and based on the area of the pixel covered, determining a shading value for the pixel by interpolating between the shade of said line segment and the shade of the background; and displaying on the output device the reduced-aliased line segment;

wherein, when two parallel edges and a third and forth orthogonal edge of said line segment traverse a partially covered pixel, the step of determining the area of the partially covered pixel includes:

computing a first area of the pixel not covered by the first parallel edge;

computing a second area of the pixel not covered by the second parallel edge; and summing the first and second areas and subtracting the sum from one to form a first difference;

computing the third area of the pixel not covered by the third orthogonal edge;

computing the fourth area of the pixel not covered by the fourth orthogonal edge;

summing the third and fourth areas and subtracting the sum from one to form a second difference; and forming a product of the first difference and the second difference.

* * * * *